Figure 1:
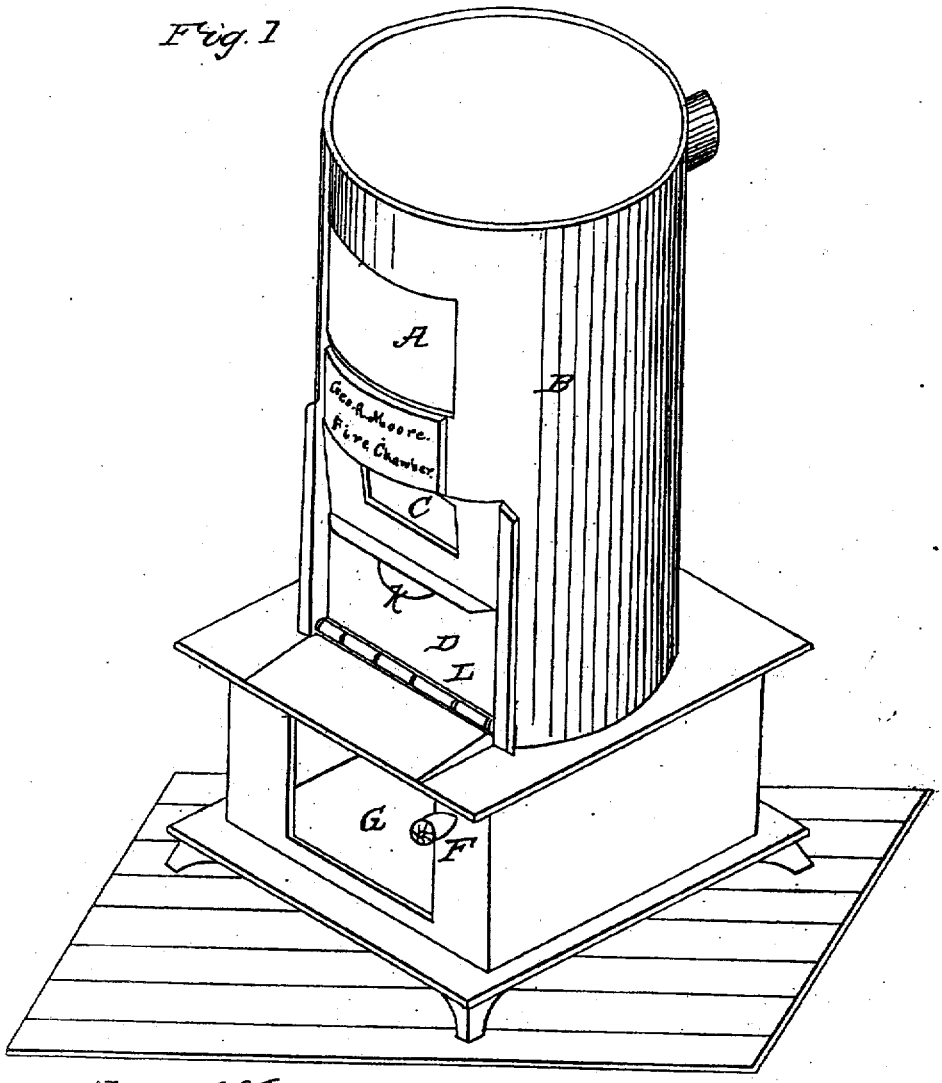

2 Sheets—Sheet 1.

G. R. MOORE.

Heating Stove.

No. 6732

Reissued Nov. 9, 1875

Witnesses

Wm. W. Sankoon

A. Rello Now

Inventor

Geo Rodney Moore.

N. PETERS, Photo-Lithographer, Washington, D.C.

2 Sheets—Sheet 2.

G. R. MOORE.

Heating Stove.

No. 6732

Reissued Nov. 9, 1875 witnesses

Wm. H. Sanborn

A. Rlewron

Inventor

Geo. Rodney Moore

N. PETERS, Photo-Lithographer, Washington, D. C.

UNITED STATES PATENT OFFICE.

GEORGE R. MOORE, OF PHILADELPHIA, PENNSYLVANIA, ASSIGNOR, BY MESNE ASSIGNMENTS, TO JOHN S. PERRY, OF ALBANY, NEW YORK.

IMPROVEMENT IN HEATING-STOVES.

Specification forming part of Letters Patent No. 54,938, dated May 22, 1866; reissue No. 6,732, dated November 9, 1875; application filed June 10, 1875.

*To all whom it may concern:*

Be it known that I, GEORGE R. MOORE, formerly of Lyons, county of Clinton and State of Iowa, and now of the city and county of Philadelphia, in the State of Pennsylvania, have invented certain new and useful Improvements in Coal-Burning Heaters, of which the following is a specification:

The nature of this invention consists, first, in the combination of a fire chamber or pot, the front wall of which forms, with the outer case, an expansion-chamber outside of said wall below the point where the two intersect, a window for illumination placed in the said outer case opposite said expansion-chamber, an open space between the base of the front wall of the fire chamber or pot and the top surface of the grate or fire-bed, and a doorway or opening in said outer case opposite the said open space, whereby the gases evolved from the fuel exposed upon the front surface of the grate may be more or less consumed in the said expansion-chamber, thus securing an increased transmission of light and heat through said illumination-window; second, in the combination of a fire chamber or pot, the front wall of which forms, with the outer case, an upwardly-closed expansion-chamber outside of said wall below the point where the two intersect, a window for illumination placed in the said outer case opposite said expansion-chamber, and an open space between the base of the front wall of the fire chamber or pot and the top surface of the grate or fire-bed, whereby the fire chamber or pot is contracted toward its base, so as to hold in suspension the superincumbent fuel therein while the clinkers and other refuse are being removed from the base of the fire-pot through the open space in front, and a close joint between the front wall of the fire-chamber at its top and the outer chamber is formed, and a chamber for the combustion of the gases between the two secured, and a window for illumination is provided opposite the open space; third, in the combination of a fire chamber or pot, the front wall of which, with the outer case, forms an expansion-chamber outside of said wall below the point where the two intersect, a doorway or opening in said outer case opposite said expansion-chamber, and an open space between the base of the front wall of the fire chamber or pot and the top surface of the grate or fire-bed, whereby the fire chamber or pot is contracted toward its base, so as to hold in suspension the superincumbent fuel therein while the clinkers and other refuse are being removed from the base of the fire-pot through the open space in front and through the doorway, and a close joint between the front wall of the fire-chamber at its top and the outer chamber is formed, and a chamber for the combustion of the gases between the two secured; fourth, in the combination of a fire chamber or pot, with its front wall contracted toward its base, an expansion-chamber formed between the front sloping wall of the said fire chamber or pot and the outer case, and below the point at which the two intersect, a window for illumination in said outer case opposite said expansion-chamber, an open space between the base of the front wall of the fire-chamber and the top surface of the grate or fire-bed, a doorway or opening in said outer case and the grate or fire-bed, the area at the front of which is greater than the area of the inside of the base of the said fire chamber or pot, whereby the spreading of the fuel upon the enlarged grate-surface in front for increased illumination and heat is secured, and the superincumbent fuel in the pot is supported while clinkers and ashes are removed through the door; fifth, in the combination of a fire chamber or pot, the front wall of which, with the outer case, forms an expansion-chamber outside of said wall below the point where the two intersect, a window for illumination in said outer case opposite said expansion-chamber, an open space between the base of the front wall of the fire chamber or pot and the top surface of the grate or fire-bed, and a grate or fire-bed, the area of which, at the front, is greater than the area of the inside of the base of the said fire chamber or pot, whereby spreading of the fuel upon the enlarged grate-surface in front for increased illumination and heat is secured, and the superincumbent fuel is supported while the clinkers and ashes are raked forward from under it; sixth, in the combination of a fire pot or chamber, the front wall of which, with the outer case, forms an expansion-chamber outside of said wall below the point where the two intersect, a doorway or opening in said outer case opposite said expansion-chamber, and an open space between the base of the front wall of the fire chamber or pot and the top surface of the grate or fire-bed, the area of which, at the front, is greater than the area of the inside of the base of the said fire chamber or pot, whereby the spreading of the fuel upon the enlarged grate-surface in front for increased heat is secured, and the superincumbent fuel is supported while the clinkers and ashes are raked forward from under it and through the door.

Figure 2:
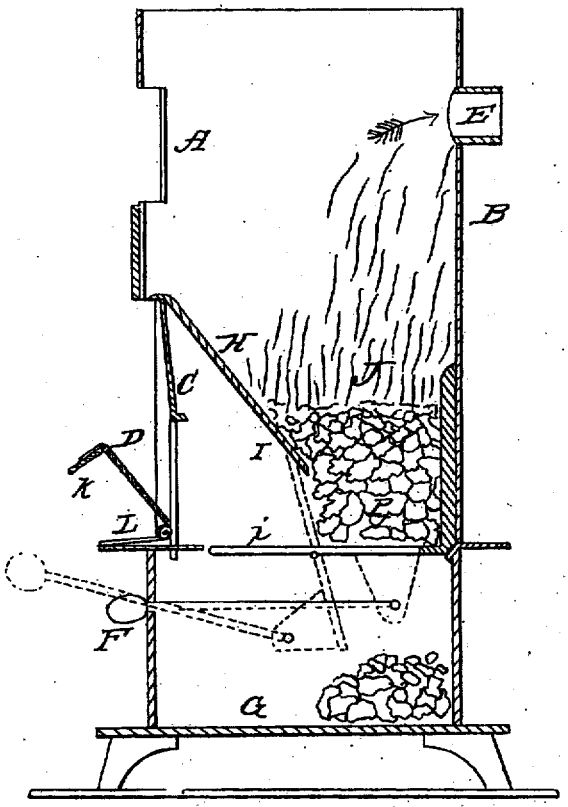

Figure 1 is a perspective view of a stove embodying the improvements which constitute this invention. The stove is shown with the top plate removed. Fig. 2 is a vertical central section of such a stove.

The following is a description of the stove, reference being had to the accompanying drawings, in which like letters refer to like parts.

A is the cylinder or outer casing, mounted upon a hollow base, B, which serves both as an ash-pit and a draft-chamber. At a convenient point in the outer casing A there is placed a fuel-supply opening, C, and also a gas and smoke exit, D. Within the outer casing A there is placed a dumping-grate or fire-bed, G, and a fire-pot or chamber, K, the front wall of which is downwardly contracted to such a point as will leave an open space between the same and the top surface of the said grate or fire-bed G. In the outer casing A an opening, M, closed by a door, N, is provided, which leads, through the expansion-chamber L and the open space J between the top surface of the grate or fire-bed, and the base of the contracted wall of the fire pot or chamber on the front, into the said pot or chamber. There is also a window, Q, filled with mica, so arranged in the outer case, and relatively to the chamber L and to the open space between the top surface of the grate or fire-bed and the base of the fire pot or chamber, as to permit the rays of light and heat from the burning fuel therein to radiate freely into the surrounding apartment. In this structure the fire-pot is contracted on its front side by the use of an inclined plate, I, which extends downward and backward from the point at which it intersects the outer case A, near the base of the feed-door C, to within a short distance of the top surface of the grate or fire-bed, and which, in connection with the fire-brick-lined portion F of the outer casing, forms a downwardly-contracted space in front, within which the greater portion of the fuel rests while the combustion is going on.

The space that exists between the top surface of the grate or fire-bed G and the base of this inclined plate I, or front wall of fire pot or chamber K, permits a portion of the fuel to flow down and spread out upon said grate. Being exposed in this position to the direct action of the air-currents from the draft-chamber below, it will burn freely, and emit a bright light, both from the incandescent fuel and from the burning gases evolved therefrom into the space L, into the surrounding apartment.

The amount of illumination may be increased by opening the door N, which, as shown in the drawing, is hinged at its lower edge, so as to open downward, thus producing substantially an open Franklin stove.

The grate G is supported upon a pivot, which permits it to turn easily, and is operated by means of a draw-rod, H, attached to the bracket O, which is secured to the under side of the said grate or fire-bed at a point in rear of its axial line, as fully shown in the drawings.

By drawing the rod H forward the grate or fire-bed is tilted down into the position shown by the dotted lines. This movement is facilitated by the open space which exists between the grate or fire-bed and the base of the fire pot or chamber and the exterior case.

With the construction shown in the drawing the weight of the superincumbent coal would rest mainly upon that half of the grate or fire-bed which lies back of the pivot, and this feature, conjoined with the open space L above the front portion of the grate or fire-bed, makes this a device peculiarly easy of operation. The immense superiority of a dumping-grate or fire-bed thus located below the mouth of a downwardly-contracted fire pot or chamber on one side, over a similar grate or fire-bed placed entirely within the mouth of the same, will be sufficiently apparent.

In addition to this ease of operation, a special advantage arising from thus combining a dumping-grate or fire-bed with a downwardly-contracted fire pot or chamber is, that when the lower part of the fire, as is not unfrequently the case, becomes deadened with clinkers and other refuse, it can be thrown down into the ash-pit without discharging the entire contents of the pot. A large portion of the fuel would be sustained by the sloping wall of the pot, while that portion containing the clinker and the other refuse could be discharged with facility into the ash-pit.

When the grate or fire-bed G is in the position as indicated by the dotted lines, the entire contents can be discharged from the pot by introducing a poker, or other suitable instrument, into it through the fuel-doorway C.

It will be observed that this improved construction combines many advantages, among which the following might be mentioned: The perpetuity of the fire after it is once kindled for an almost indefinite period, by replenishing it with fuel periodically, and stirring the incandescent mass upon the grate or fire-bed through the doorway or opening M, the expansion-chamber, and the open space between the top surface of the grate or fire-bed and the base of the front sloping wall of the fire pot or chamber. By means of the doorway or opening M, easy access can be had to the open space between the top surface of the grate and the base of the pot on the front, for the purpose of removing the clinker and other refuse from the surface of the said grate or fire-bed, thus permitting the fresh fuel to descend from above. Again, if the fire is properly managed, this construction insures at all times a brilliant illumination from the incandescent fuel in the open space J and the expansion-chamber L. The spreading out of the coal upon the enlarged grate or fire-bed, in connection with the said chamber L, produces a more perfect combustion, and adds to both the illuminating and heating qualities of the structure.

What I claim as my invention is—

1. The combination of a fire pot or chamber, K, which forms, with the outer case A, an expansion-chamber, L, between the two below their point of intersection, the window Q for illumination, placed in the said outer case A opposite said expansion-chamber, the open space J between the base of the front wall of the fire pot or chamber and the top surface of the grate or fire-bed G, and the doorway or opening M in said outer case opposite the said open space, all for the purposes as described and set forth.

2. The combination of a fire pot or chamber, K, the front wall of which forms, with the outer case A, an expansion-chamber, L, between the two below their point of intersection, the window Q for illumination, placed in the said outer case A opposite said expansion-chamber, and the open space J between the base of the front wall of the fire pot or chamber and the top surface of the grate or fire-bed G, all for the purposes as described and set forth.

3. The combination of a fire pot or chamber, K, the front wall of which forms, with the outer case A, an expansion-chamber, L, between the two below their point of intersection, the doorway or opening M in said outer case opposite said expansion-chamber, and the open space J between the base of the front wall of the fire pot or chamber and the top surface of the grate or fire-bed G, all for the purposes described and set forth.

4. The combination of a fire pot or chamber, K, which is contracted toward its base, the expansion-chamber L, formed between the front sloping wall I of the said fire pot or chamber and the outer case A, and below the point at which the two intersect, the window Q for illumination in said outer case opposite said expansion-chamber, the open space J between the base of the front wall of the fire pot or chamber and the top surface of the grate or fire-bed G, the doorway or opening M in said outer case, and the grate or fire-bed, the area of which at the front is greater than the area of the inside of the base of the said fire pot or chamber, all for the purposes as described and set forth.

5. The combination of a fire pot or chamber, K, which is contracted toward its base, the expansion-chamber L, formed between the front sloping wall I of the said fire pot or chamber and the outer case A, and below the point at which the two intersect, the window Q for illumination in said outer case opposite said expansion-chamber, the open space J between the base of the front wall of the fire pot or chamber and the top surface of the grate or fire-bed G, the area of which at the front is greater than the area of the inside of the base of the said fire pot or chamber, all for the purposes as described and set forth.

6. The combination of a fire pot or chamber, K, which is contracted toward its base, the expansion-chamber L, formed between the front sloping wall I of the said fire pot or chamber and the outer case A, and below the point at which the two intersect, the doorway or opening M in said outer case opposite said expansion-chamber, and the open space between the base of the front wall of the fire pot or chamber and the top surface of the grate or fire-bed G, the area of which at the front is greater than the area of the inside of the base of the said fire pot or chamber, all for the purposes as described and set forth.

GEO. R. MOORE.

Witnesses:
GEO. B. HOWELL,
THOS. CASEY.